July 27, 1971
C. A. COOK
3,595,729
PALLET WHEREIN SPACER MEMBERS ARE FORMED
OF RIGID FOAM POLYMERIC MATERIAL
Filed June 11, 1969
2 Sheets-Sheet 1
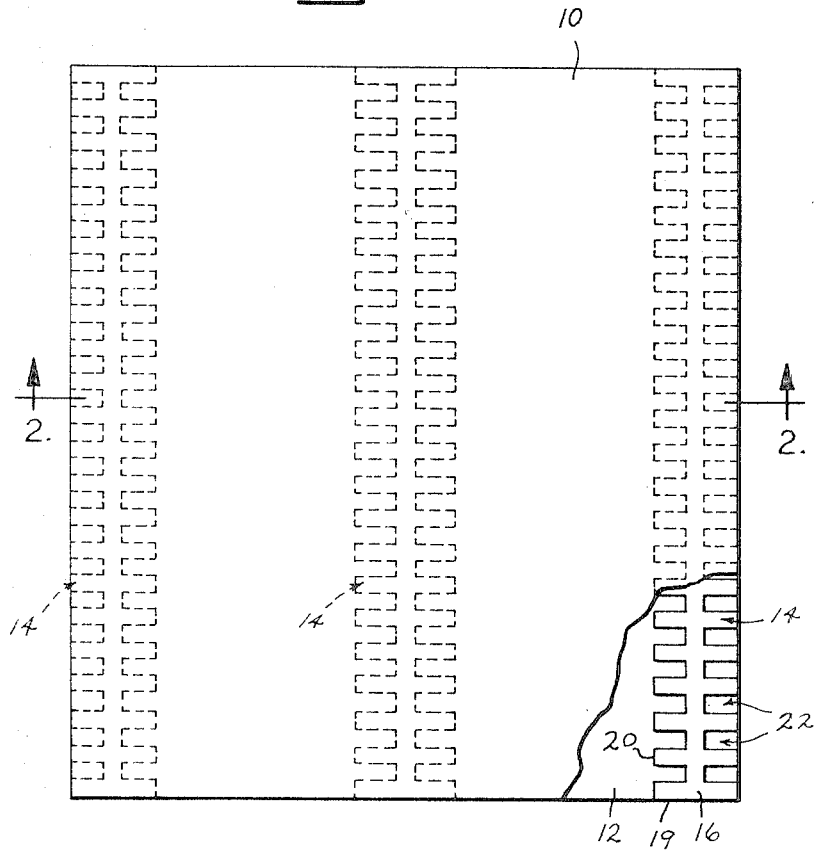
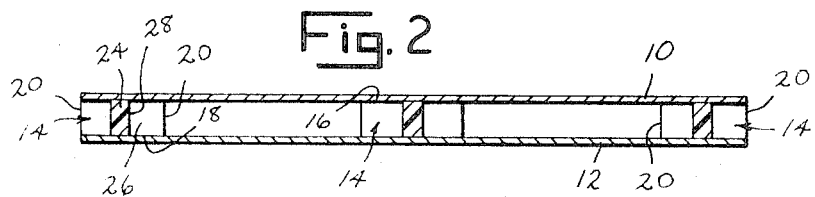
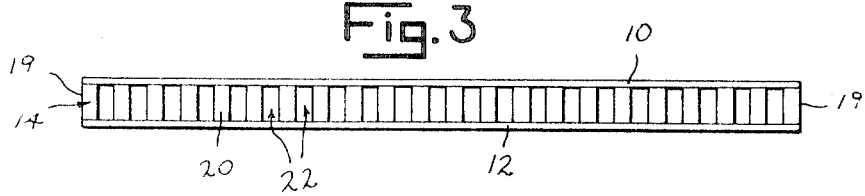
INVENTOR.
CHARLES A. COOK
BY Oltsch & Knoblock
ATTORNEYS INVENTOR.
CHARLES A. COOK
BY Oltsch & Knoblock
ATTORNEYS United States Patent Office 3,595,729
Patented July 27, 1971

3,595,729
PALLET WHEREIN SPACER MEMBERS ARE FORMED OF RIGID FOAM POLYMERIC MATERIAL
Charles A. Cook, Bristol, Ind., assignor to Engineered Foam Plastics, Inc., Elkhart, Ind.
Filed June 11, 1969, Ser. No. 832,128
Int. Cl. B32b *3/12*
U.S. Cl. 161—69     6 Claims

ABSTRACT OF THE DISCLOSURE

A pallet having a substantially horizontal planar upper support member and a plurality of spacer members attached to the lower side of said support member. Each spacer member is formed of a rigid foam polymeric material and is laterally spaced from each other. Each spacer member further includes first and second oppositely positioned side edges and has a plurality of transversely directed slots therein which project inwardly from each of said first and second side edges.

SUMMARY OF THE INVENTION

This invention relates to a pallet having a plurality of spacer members formed of rigid foam polymeric material and a method of forming said spacer members. Each spacer member includes first and second oppositely positioned side edges and has a plurality of transversely directed slots therein which projected inwardly from each of said first and second side edges.

It has been found that spacer members for pallets formed from rigid foam polymeric material have a decided advantage over other types of spacer members, such as wooden spacer members. Such polymeric spacer members are economical to produce and of light weight, have an exceptionally high crushing resistance based upon unit mass, and can be utilized in pallets which are generally disposed of after being used once or twice.

In order to produce an economical pallet spacer member formed from rigid polymeric material having high resistance to crushing, it has been found that two criteria should be followed. One, for a given mass of polymeric material and a given load supporting surface area, the overall length and width of the spacer member should be maximized to provide for an increased distribution of pallet load over the spacer member. Two, all side edges of the spacer member should be oriented in the direction of the pallet load and be of molded form because it has been found that a side edge of rigid foam polymeric material which has been formed by molding and thus has a skin thereover provides more rigidity to the material than a side edge of rigid foam polymeric material formed by cutting or other similar shaping means. The spacer members utilized in the pallet disclosed in Patent No. 3,380,403, although designed in accordance with the criteria above mentioned, have the disadvantage of being fixed as to size. In order to vary the length and width of the spacer members described in this patent to meet various pallet design and load requirements, separate molds for each sized spacer member are required. The necessity of having to provide different sized molds to accommodate varying design and load requirements of the pallets increases the cost of the pallets and can effect the economical advantage of one manufacturer's pallet over another manufacturer's pallet.

The spacer members forming a part of this invention have an overall length and width which exceeds the overall length and width of known prior art pallet spacer members formed from an equal amount of rigid foam polymeric material and having an equal load supporting surface area. This increase in the overall length and width of the spacer member results in an increase in pallet load distribution over the spacer member as compared to the load distribution over the prior art spacer members, thus adding to its resistance to crushing. Additionally, the spacer member forming a part of this invention can be formed from a large molded block of rigid foam polymeric material by cutting the block in such a manner that substantially all surfaces of the spacer member which are oriented in the direction of the pallet load will be of molded form. In this manner, the spacer members can be economically formed into various sizes so as to accommodate prescribed pallet design and load criteria without the need of numerous sized molds.

Accordingly, it is an object of this invention to provide a spacer member for use in a pallet in which the spacer member, by virtue of its design, is of economical construction and has a high resistance to crushing under load.

It is another object of this invention to provide a pallet spacer member which is formed of rigid foam polymeric material and which, for a given thickness and mass, provides for a maximum distribution of pallet load over said spacer member.

Another object of this invention is to provide a pallet of economical construction and high strength.

It is still another object of this invention to provide a method of forming a spacer member for a pallet in which said spacer member is of economical construction and is made of rigid foam polymeric material and has a high resistance to crushing.

Other objects of this invention will become apparent upon a reading of the invention's description.

BRIEF DESCRIPTION OF THE DRAWINGS

A preferred embodiment of this invention has been chosen for purpose of illustration and description wherein:

FIG. 1 is a top plan view of the pallet with a portion broken away.

FIG. 2 is a sectional view of the pallet taken along line 2—2 of FIG. 1.

FIG. 3 is a side view of the pallet.

DESCRIPTION OF THE PREFERRED EMBODIMENT

Figure 4:
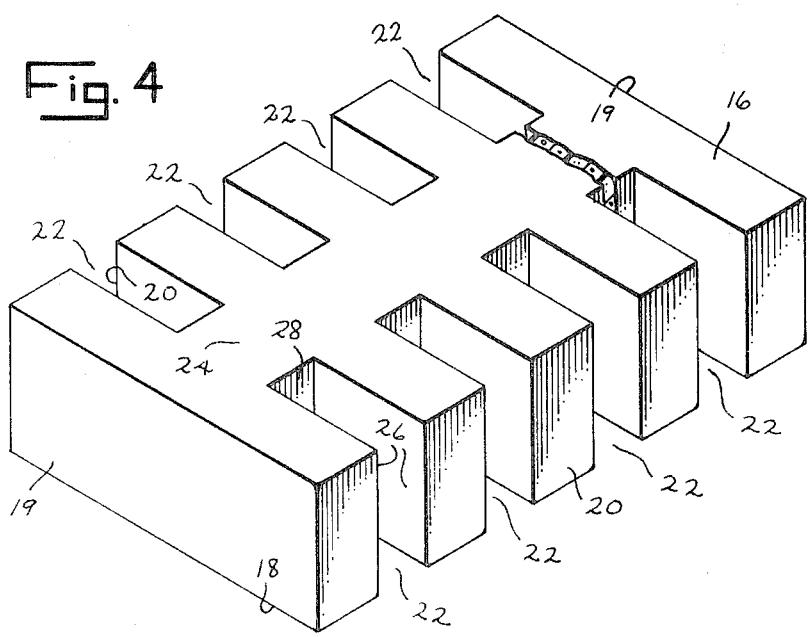
FIG. 4 is a perspective view of a spacer member of the pallet in fragmentary form.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Referring to FIGS. 1–3, the pallet illustrated as the preferred embodiment of this invention includes an upper substantially horizontal planar member or platform 10, a lower planar member or base 12 which is spaced from and positioned substantially parallel to platform 10, and a plurality of laterally spaced spacer members or blocks 14 positioned or sandwiched between platform 10 and base 12. Platform 10 and base 12 are preferably constructed from plywood or corrugated paperboard and spacer members 14 are preferably formed from a rigid foam polymeric material, such as polystyrene or urethane.

Each spacer member 14 includes an upper surface 16 which is substantially flat, a lower surface 18 which is substantially parallel surface 16, a pair of opposite side edges 19 and another pair of opposite side edges 20. The upper surface 16 and lower surface 18 of each member 14 are bonded, such as by an adhesive, to the inner surfaces of platform 10 and base 12 respectively. Each spacer member 14 has a plurality of slots 22 formed therein which extend from upper surface 16 to lower surface 18 and transversely inwardly into the spacer member from each side edge 20. Each slot 22 extending inwardly from one side edge 20 is preferably oppositely located from a corresponding slot 22 extending inwardly from the other side edge 20 and is spaced therefrom by a web part 24 which is preferably centrally located between the side edges. Slots 22 are preferably of equal width and are preferably each defined by parallel opposed side faces 26 and an end face 28. The spacing between slots along each side edge 20 preferably exceeds the width of the slots. Slots 22 preferably comprise approximately a 30% void in the overall surface area of each spacer member as defined by the mathematical product of the length and width of the spacer member. Although slots 22 are shown in oppositely paired relation, it is to be understood that the slots could be formed in a staggered relation. Side edges 20 and each slot defining face 26 and 28 of each spacer member are of molded form, that is, have skin surfaces, and are preferably disposed perpendicularly to platform 10, that is, oriented in the direction of pallet load. Additionally, side edges 19 of each spacer member are preferably substantially of molded form and oriented in the direction of pallet load. The size, location between platform 10 and base 12, and number of spacer members per pallet will vary depending upon the design and load requirements of the pallet.

Figure 5:
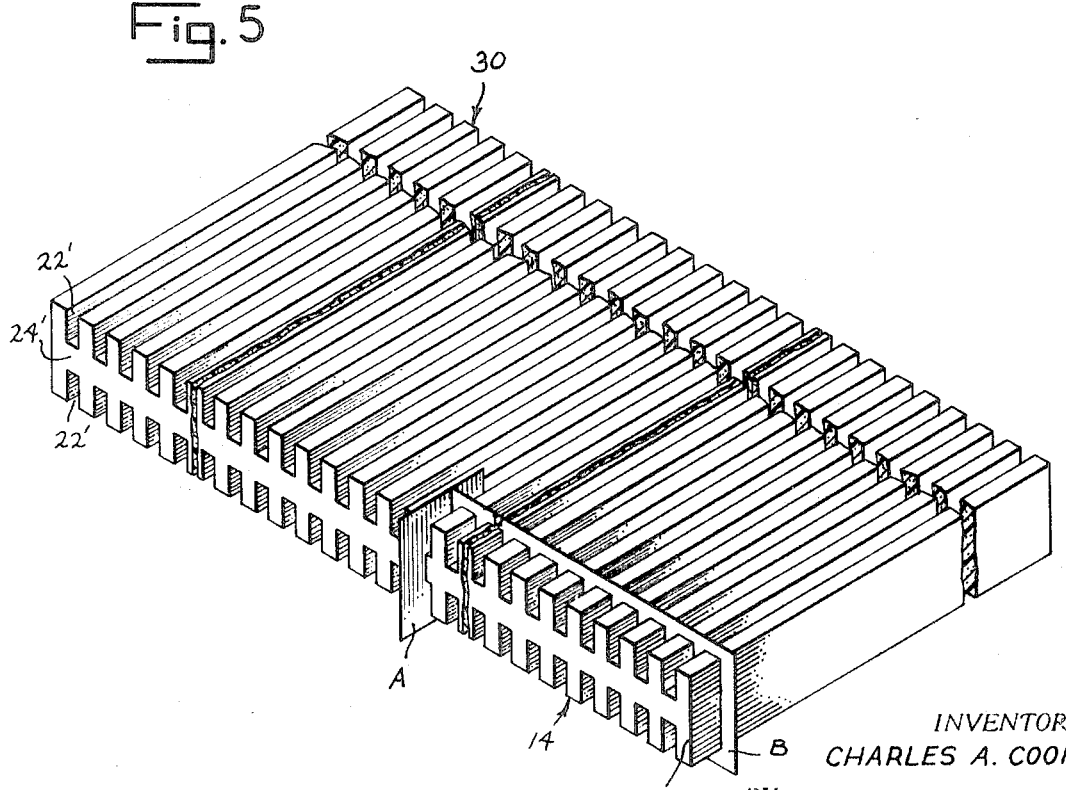
FIG. 5 is a perspective view of a molded block of polymeric material from which the spacer member of FIG. 4 was formed.

FIG. 5 is illustrative of a molded block 30 of rigid foam polymeric material from which the spacer members of this invention may be constructed or formed. Block 30 may assume any overall dimension depending upon the size of the mold used to produce the block. Molds of sufficient size to produce a block 144 inches long, 48 inches wide and 8 inches in thickness would not be uncommon. To produce block 30, a mold having an elongated cavity conforming in shape to block 30 and defined in part by first and second opposed side walls each having parallel inwardly protruding parts which extend the width of the mold and which are opposed to corresponding protruding parts extending inwardly from the other opposed side wall is provided. The mold is filled with prefoamed beads of polymeric material, such as expandable B polystyrene, having a density of approximately two pounds per cubic foot. The prefoamed polymeric material in the mold is then heated, preferably by steam, to a temperature of approximately 230° F., causing the beads of material to expand, adhere to one another, and conform to the mold cavity. The expanded polymeric material is then cooled, preferably with water, until it takes a set to permit its removal from the mold. The cooled polymeric material is then removed from the mold and dried, preferably in a kiln, thus forming block 30. Block 30 is then cut by a hot wire, or other cutting means, along planes A and B shown in FIG. 5 to form a spacer member 14. The length and the thickness of the spacer member thus formed will vary depending upon the spacing of cutting planes A and B from reference corner C of the block. Each spacer member 14 is preferably separated from block 30 along plane A at a central web part 24' which serves to define in part opposite corresponding slots 22' in the block. All surfaces or faces of the spacer member which are oriented or disposed in the direction of pallet load with the exception of that small portion of one side of the spacer member which at one time formed a central part 24' of block 30, are of molded form.

It is to be understood that spacer members 14 need not extend the full length of the pallet, as shown in FIGS. 1–4, but can be of shortened form and selectively positioned at various locations between platform 12 and 14. Also, it is to be understood that the pallet of this invention need not include base 12, but can simply be constructed from platform 10 and spacer members 14.

What I claim is:

1. A pallet comprising a substantially horizontal planar upper support member and a plurality of laterally spaced spacer members each having an upper surface secured to the lower surface of said support member, each spacer member including first and second oppositely positioned side edges and having formed therein a plurality of slots which project inwardly from said side edges and extend from said upper surface to the lower surface of said spacer member and wherein said spacer members are formed of a rigid foam polymeric material and the faces of each slot are of molded form and disposed substantially perpendicular to said support member.

2. The pallet of claim 1 wherein each slot in said first side edge is positioned oppositely a slot in said second side edge.

3. The pallet of claim 2 wherein each spacer member includes a part positioned substantially centrally between said first and second side edges separating said oppositely positioned slots.

4. The pallet of claim 1 wherein said slots are substantialy rectangular in shape and of equal width.

5. The pallet of claim 5 wherein the spacing between adjacent slots in one side edge exceeds the width of said slots.

6. The pallet of claim 1 wherein said slots comprise about 30% of the surface area of each spacer member as defined by the mathematical product of the length and width of said spacer member.

References Cited

UNITED STATES PATENTS

| | | | |
|---|---|---|---|
| 2,583,443 | 1/1952 | Perry et al. | 156—281X |
| 3,133,853 | 5/1964 | Knox | 161—119 |
| 3,159,115 | 12/1964 | Nolan | 108—58X |
| 3,188,264 | 6/1965 | Holden | 161—172X |
| 3,369,821 | 2/1968 | Weber | 161—123X |
| 3,380,403 | 4/1968 | Sullivan | 108—51 |
| 3,472,728 | 10/1969 | Hitch | 161—69 |
| 3,505,162 | 4/1970 | Rasmussen | 161—168 |

JOHN T. GOOLKASIAN, Primary Examiner

H. F. EPSTEIN, Assistant Examiner

U.S. Cl. X.R.

52—615; 108—58